US012665233B2

(12) United States Patent
Lee et al.

(10) Patent No.: US 12,665,233 B2
(45) Date of Patent: Jun. 23, 2026

(54) METHOD FOR RECYCLING POSITIVE ELECTRODE MATERIAL

(71) Applicant: LG ENERGY SOLUTION, LTD., Seoul (KR)

(72) Inventors: Jeong Bae Lee, Daejeon (KR); Young Joo Choi, Daejeon (KR); Jeong Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 828 days.

(21) Appl. No.: 18/008,629

(22) PCT Filed: Sep. 9, 2021

(86) PCT No.: PCT/KR2021/012274
§ 371 (c)(1),
(2) Date: Dec. 6, 2022

(87) PCT Pub. No.: WO2022/055272
PCT Pub. Date: Mar. 17, 2022

(65) Prior Publication Data
US 2023/0223611 A1 Jul. 13, 2023

(30) Foreign Application Priority Data
Sep. 11, 2020 (KR) ........................ 10-2020-0116722

(51) Int. Cl.
*H01M 4/131* (2010.01)
*C01G 53/50* (2025.01)
(Continued)

(52) U.S. Cl.
CPC ............ *H01M 10/54* (2013.01); *C01G 53/50* (2013.01); *C22B 1/005* (2013.01); *C22B 7/001* (2013.01);
(Continued)

(58) Field of Classification Search
CPC ......... C22B 7/001; C22B 1/005; C22B 7/006; H01M 10/54; H01M 4/131; H01M 4/525;
(Continued)

(56) References Cited

U.S. PATENT DOCUMENTS 5,473,319 A 12/1995 Asai
5,491,037 A 2/1996 Kawakami
(Continued)

FOREIGN PATENT DOCUMENTS

CN 103915661 A 7/2014
CN 109461892 A 3/2019
(Continued)

OTHER PUBLICATIONS

Yanlan Zhao et al., "Regeneration and reutilization of cathode materials from spent lithium-ion batteries", Chemical Engineering Journal, Elsevier, Amsterdam, NL, vol. 383, Oct. 8, 2019, XP085971052, ISSN: 1385-8947, DOI: 10.1016/J.CEJ.2019.123089 *p. 2-p. 3*.

*Primary Examiner* — Cam N. Nguyen
(74) *Attorney, Agent, or Firm* — Bryan Cave Leighton Paisner LLP

(57) ABSTRACT

A method for recycling a positive electrode material. the method includes obtaining positive electrode material particles from a positive electrode. The method further includes mixing the positive electrode material particles with a solution or powder containing sodium ions and heat-treating the mixture including the positive electrode material particles and the solution or power containing sodium ions. The method further includes rinsing the heat-treated positive electrode material particles with water.

14 Claims, 3 Drawing Sheets

(51) Int. Cl.

| *C22B 1/00* | (2006.01) |
|---|---|
| *C22B 7/00* | (2006.01) |
| *H01M 4/525* | (2010.01) |
| *H01M 10/54* | (2006.01) |

(52) U.S. Cl.
CPC .......... *C22B 7/006* (2013.01); *C01P 2002/50* (2013.01); *C01P 2002/72* (2013.01); *C01P 2006/40* (2013.01)

(58) Field of Classification Search
CPC .............. H01M 2004/028; C01G 53/50; C01P 2002/50; C01P 2002/72; C01P 2006/40; C01P 2004/51; C01P 2004/61; C01P 2006/11; C01P 2006/80; Y02P 10/20
USPC .......................................................... 423/49
See application file for complete search history.

(56) References Cited

U.S. PATENT DOCUMENTS

| 5,882,811 | A | 3/1999 | Kawakami |
| 6,228,143 | B1 | 5/2001 | Aiken et al. |
| 9,023,130 | B2 * | 5/2015 | Kudo ...................... C22B 7/006 |
| | | | 75/743 |
| 10,270,139 | B1 * | 4/2019 | Deak .................. C22B 21/0069 |
| 11,621,415 | B2 * | 4/2023 | Hattori .................. H01M 4/131 |
| | | | 429/223 |
| 2013/0302226 | A1 | 11/2013 | Wang et al. |
| 2013/0323142 | A1 | 12/2013 | Shimano et al. |
| 2017/0077564 | A1 | 3/2017 | Wang et al. |
| 2018/0212282 | A1 | 7/2018 | Lee et al. |
| 2018/0261894 | A1 | 9/2018 | Wang et al. |
| 2019/0123402 | A1 | 4/2019 | Wang et al. |
| 2019/0153563 | A1 | 5/2019 | Liu et al. |
| 2019/0260100 | A1 | 8/2019 | Sloop |
| 2023/0080556 | A1 * | 3/2023 | Press Frimet .......... C22B 26/12 |
| | | | 75/743 |
| 2023/0223611 | A1 | 7/2023 | Lee et al. |

FOREIGN PATENT DOCUMENTS

| CN | 110311186 | A | 10/2019 |
|---|---|---|---|
| CN | 110323509 | A | 10/2019 |
| CN | 111392750 | A | 7/2020 |
| JP | H06-251805 | A | 9/1994 |
| JP | 2001250594 | A | 9/2001 |
| JP | 2003007298 | A | 1/2003 |
| JP | 2012186150 | A | 9/2012 |
| JP | 2013211234 | A | 3/2013 |
| JP | 2015-092465 | A | 5/2015 |
| JP | 2015092466 | A | 5/2015 |
| JP | 6612506 | B | 11/2019 |
| JP | 2020129505 | A | 8/2020 |
| JP | 2023530325 | A | 7/2023 |
| KR | 10-2003-0070468 | A | 8/2003 |
| KR | 10-2014-0085768 | A | 7/2014 |
| KR | 10-2016-0025542 | A | 3/2016 |
| KR | 10-1682217 | B | 12/2016 |
| KR | 10-2017-0033787 | A | 3/2017 |
| KR | 10-2018-0080992 | A | 7/2018 |
| KR | 10-2018-0087615 | A | 8/2018 |
| KR | 10-1992715 | B | 6/2019 |
| KR | 10-2019-0077247 | A | 7/2019 |
| KR | 10-2008582 | B1 | 8/2019 |
| KR | 10-2020-0053814 | A | 5/2020 |

* cited by examiner

METHOD FOR RECYCLING POSITIVE ELECTRODE MATERIAL

CROSS-REFERENCE TO RELATED APPLICATIONS

This application is a National Phase entry pursuant to 35 U.S.C. § 371 of International Application No. PCT/KR2021/012274 filed on Sep. 9, 2021, and claims priority to and the benefit of Korean Patent Application No. 10-2020-0116722, filed on Sep. 11, 2020, in the Korean Intellectual Property Office, the disclosure of which is incorporated herein in its entirety by reference.

TECHNICAL FIELD

The present disclosure relates to a method for recycling a positive electrode material in a secondary battery. More specifically, the present disclosure relates to a method for efficiently recycling a positive electrode material to an extent close to an original form thereof from a secondary battery, using a solution or powder containing sodium ions in a heat-treatment process.

BACKGROUND

Lithium secondary batteries provide benefits such as high energy density, high electromotive force, and high capacity, and thus are widely used in various industrial fields. For example, lithium secondary batteries are being applied to various products from small portable devices such as smartphones and laptops to electric vehicles (EVs) that are expected to replace current fossil-fuel-powered vehicles in the future, and accordingly, there is a growing number of lithium secondary batteries scrapped after reaching their service life as well.

Meanwhile, lithium, a core component of lithium secondary batteries, is generally processed from ore containing lithium, the cost for manufacturing processes and the price of the raw material itself bring about lithium metals with a relatively high price tag when traded. Accordingly, in addition to studies on the performance of lithium secondary batteries themselves, there is also a high demand for research on methods for efficiently recycling lithium from a gradually increasing number of used lithium secondary batteries.

Currently, a commonly known method for recycling lithium from lithium secondary batteries includes a method designed to separate a positive electrode active material from a lithium secondary battery, dissolve positive electrode active material powder through a sulfuric acid leaching process, and then sequentially use a solvent extractant to separate various metals, but in the case, a large amount of sodium compounds are used in the extraction process, and that serves as an obstacle to eventually separating sodium and lithium with high purity. The case comes with poor economic feasibility in that lithium components are obtained in the form of raw materials, which requires a process for manufacturing a positive electrode material from the beginning in order to use the lithium components for lithium secondary batteries. In response, studies have been conducted lately on a direct recycling method designed to keep the original form of positive electrode material powder and solely remove impurities to use the obtained again as a positive electrode material instead of performing typical recycling processes such as leaching/extraction/purification/ crystallization by recovering positive electrode material powder from secondary batteries or positive electrodes.

SUMMARY

To solve the tasks described herein, the present disclosure provides a method for recycling a positive electrode material included in a secondary battery without loss of an original form thereof.

Specifically, the present disclosure provides a method of mixing positive electrode material particles with a solution or powder containing sodium ions and heat-treating the mixture to minimize the loss of lithium components in a positive electrode material and to maximally remove fluorine components on a surface of the positive electrode material, thereby recycling the positive electrode material.

According to an aspect of the present disclosure, there is provided a method for recycling a positive electrode material, the method may include: obtaining positive electrode material particles from a positive electrode (S1); mixing the positive electrode material particles with a solution or powder containing sodium ions and heat-treating the mixture including the positive electrode material particles and the solution or power containing sodium ions (S2); and rinsing the heat-treated positive electrode material particles with water (S3).

In accordance with embodiments of the present disclosure, the method may further include, at step S1, crushing the positive electrode of a lithium secondary battery into crushed parts (S1-1), and classifying the crushed parts to separate the positive material particles from current collector particles (S1-2).

The step S1 may be performed using a chemical solvent treatment method or a heat-treatment method. The solution or the powder containing sodium ions may be alkaline.

The solution or the powder containing sodium ions may be prepared using at least one selected from the group consisting of $NaOH$, $Na_2CO_3$, and $NaHCO_3$. The solution or the powder containing sodium ions may have a sodium amount of 150% to 200% with respect to the number of moles of Fluorine. The solution containing sodium ions may have a sodium concentration of 0.1 to 10 M. The heat-treatment may be performed in an oxygen-free atmosphere. The oxygen-free atmosphere may be an atmosphere having an oxygen concentration of 3 volume % or less. The oxygen-free atmosphere may be formed by including at least one gas selected from nitrogen, carbon dioxide, and an inert gas. The heat-treatment may be performed in an oxygen enrichment atmosphere. The oxygen enrichment atmosphere may be an atmosphere having an oxygen concentration of 20 volume % or greater. The heat-treatment is performed at 250 to 800° C.

When a method for recycling a positive electrode material is applied as provided herein, positive electrode material particles are mixed with a solution or powder containing sodium ions and then heat-treated to remove fluorine components of a fluorine-based polymer binder remaining on a surface of the positive electrode material in the form of sodium fluoride instead of lithium fluoride, thereby minimizing the loss of lithium to recycle the positive electrode material.

In addition, when a method for recycling a positive electrode material is applied as provided herein, generation of hydrogen fluoride, which may act as a strong acid upon heat-treatment, may be prevented to allow the positive electrode material to be recycled without adversely affecting equipment durability.

BRIEF DESCRIPTION OF THE DRAWINGS

The following drawings attached to the specification illustrate preferred examples of the present disclosure by example, and serve to enable technical concepts of the present disclosure to be further understood together with detailed description of the disclosure given below, and therefore the present disclosure should not be interpreted only with matters in such drawings.

DETAILED DESCRIPTION

Figures 1, 2:
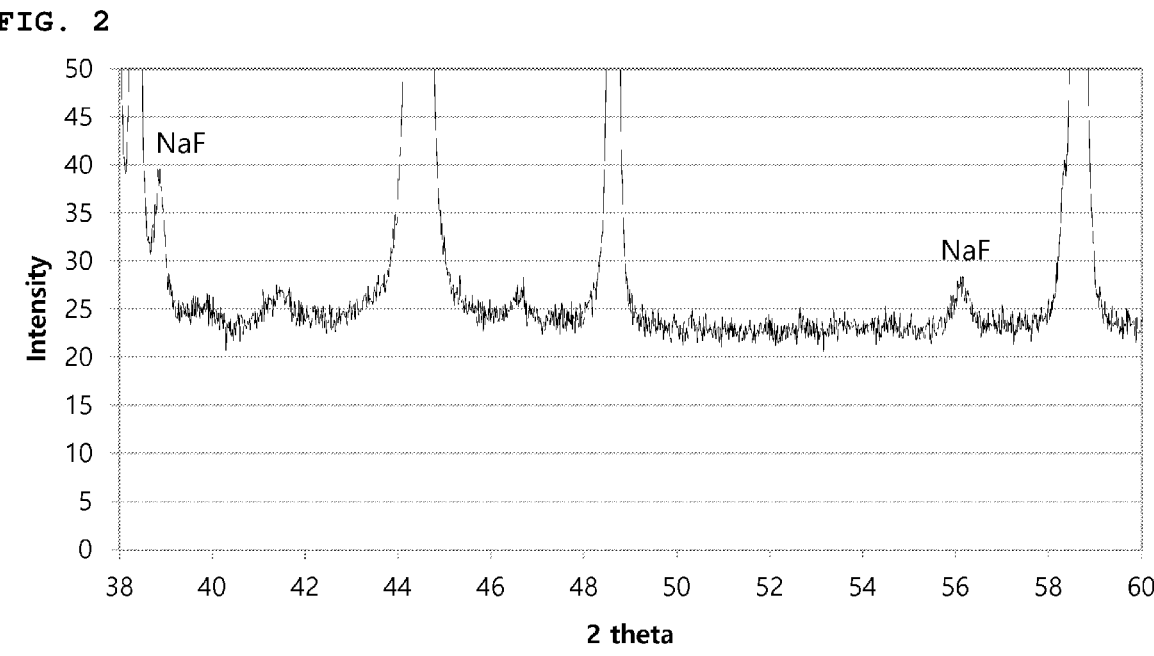
FIGS. 1 to 4 are graphs of XRD analysis of powder obtained after heat-treatment in Examples 1 to 4, respectively.

Hereinafter, the present disclosure will be described in more detail.

It will be understood that words or terms used in the specification and claims of the present disclosure shall not be construed as being limited to having the meaning defined in commonly used dictionaries. It will be further understood that the words or terms should be interpreted as having meanings that are consistent with their meanings in the context of the relevant art and the technical idea of the disclosure, based on the principle that an inventor may properly define the meaning of the words or terms to best explain the disclosure.

Method for Recycling Positive Electrode Materials

The present disclosure provides a method for recycling a positive electrode material, the method including: obtaining positive electrode material particles from a positive electrode (S1); mixing the positive electrode material particles with a solution or powder containing sodium ions and heat-treating the mixture (S2); and rinsing the heat-treated positive electrode material particles with water (S3).

Hereinafter, the method for recycling lithium will be described step by step.

Obtaining Positive Electrode Material Particles from a Positive Electrode (S1)

The method for recycling lithium according to the present disclosure includes obtaining positive electrode material particles from a positive electrode, for example, a positive electrode of a used lithium secondary battery. In a lithium secondary battery, a positive electrode serves as a source of lithium ions, and a positive electrode active material, which is a lithium oxide-based compound, is bonded to a current collector via a binder to form the positive electrode. The present disclosure is to recycle a positive electrode active material to an extent close to an original form thereof, and thus in the present disclosure, positive electrode material particles are obtained from a positive electrode and then subjected to positive electrode material recycling treatment.

Meanwhile, the positive electrode active material of the positive electrode material is not particularly limited as long as lithium elements are included therein, and for example, lithium nickel cobalt aluminum oxide (LiNiCoAlO$_2$, NCA), lithium nickel cobalt manganese oxide (LiNiCoMnO$_2$, NCM), lithium iron phosphorus oxide (LiFePO$_4$, LFP), lithium manganese iron phosphorus oxide (LiMnFePO$_4$, LMFP), lithium manganese oxide (LiMn$_2$O$_4$, LMO), lithium nickel manganese oxide (LiNi$_{0.5}$Mn$_{1.5}$O$_4$, LNMO), lithium cobalt oxide (LiCoO$_2$, LCO), and the like may be used as the positive electrode active material of the present disclosure. In addition, the positive electrode material particles in the present disclosure refer to particles including a positive electrode active material, and specifically, may be a powder-type positive electrode material.

A specific method for obtaining the positive electrode material particles from a lithium secondary battery in the present step may include crushing the positive electrode of a lithium secondary battery (S1-1), and classifying the crushed particles to separate the positive material particles from collector particles (S1-2). As described above, the positive electrode is present in the form in which the positive electrode material, that is, the positive electrode active material, is mixed with a polymer binder and a carbon-based conductive material and applied to a current collector, and accordingly, in the crushing step, the positive electrode active material applied to the current collector, a portion of the polymer binder and the carbon-based conductive material may be deintercalated, in the subsequent classifying step, current collector and the powder positive electrode active material particles that are crushed together may be separated, and the separated positive electrode active material particles may be used as positive electrode material particles of the present disclosure.

In the present disclosure, in order to recycle and use the positive electrode material particles of a secondary battery in an original form (e.g., in the form the positive electrode material was originally made) thereof as much as possible, the positive electrode material particles physically bonded to a current collector and the like need to be separated through the steps of crushing and classifying described above, and the positive electrode material particles obtained through the above steps relatively have a uniform size of individual particles to be easily used even after being finally recycled.

The positive electrode material particles obtained through the present step may have a tap density of 1.0 to 1.2 g/cc, and an average particle diameter of 5 μm or greater. In addition, with respect to volume, the ratio having a particle size of 5 to 10 μm in the particle size distribution of the obtained positive electrode material particles may be 2 to 10%, preferably 4 to 6%. The positive electrode material particles have an average particle diameter in the above-described range because the positive electrode active material in the form of secondary particles is mixed with a conductive material and a polymer binder. In addition, the amount of particles incorporated in the current collector in the positive electrode material particles subjected to crushing and classifying in the present disclosure may be 2000 ppm or less, preferably 1000 ppm or less, so that impurities in the steps of crushing and classifying may be removed as much as possible.

Meanwhile, specific methods of the crushing and the classifying are not particularly limited, and any means used for crushing and classifying in the art may be applied to the present disclosure without limitation. For example, the crushing may be performed through methods such as ball mill, hammer mill, jet mill, or disk mill, which is a general milling method, and the classifying may be performed through a device such as a cyclone classifier. In particular, the classifying may use a three-dimensional ultrasonic vibration classifier (twist screen) having different mesh sizes of an upper end and a lower end, and in this case, most of the current collector particles are filtered through a sieve at the upper and lower ends, and the positive electrode material particles pass through the sieve at the lower end and may be used after being collected.

In addition, the present step may be performed through a chemical solvent treatment method in addition to the crushing and the classifying. Specifically, a polymer binder bonding a positive electrode material with a current collector is easily dissolved in a solvent such as methylpyrrolidone (NMP) or dimethylacetamide (DMAC), and thus, when a positive electrode of a used lithium secondary battery is immersed in the solvent described above, the positive electrode material particles may be separated. However, the positive electrode material particles that are present in a form directly attached to an aluminum current collector may not be easily stirred using an impeller or the like in the process of chemical solvent treatment, and the positive electrode material particles may be separated well only when additional treatment such as ultrasonic treatment is accompanied after immersion, but the additional treatment may reduce process efficiency. Furthermore, due to the fact that, after the chemical solvent treatment, a polymer binder such as polyvinylidene fluoride (PVDF) is dissolved in a solvent, it is hard to reuse the solvent, and even for the solvent reuse, a purification process may be required, which may reduce economic feasibility, and may incur a huge cost for disposing the solvent.

In addition, the present step may be performed through heat-treatment. In one embodiment, the heat-treatment may thermally remove a polymer binder bonding a positive electrode material and a current collector and separate positive electrode material particles from the current collector. When the present step is performed through heat-treatment, the temperature at which the heat-treatment is performed may vary depending on the type of polymer binder or the type of conductive material used for the preparation of a positive electrode, but the temperature may be in the range of 450 to 500° C. with respect to PVDF, which is commonly used, and may be in the range of 500 to 550° C. when a carbon-based conductive material is used. Equipment for performing heat-treatment is not particularly limited as long as a heating means is provided, but when dealing with a large amount of secondary batteries at once, it is particularly preferable to use rotary heat-treatment equipment such as a rotary kiln, given that exposure temperature gradient may become significant due to lamination. However, when the heat-treatment is used, the mechanical properties of the current collector deteriorate at high temperatures and when rotation is accompanied in the heat-treatment equipment, physical impact therefrom may cause a large amount of fine current collector particles, for example, aluminum particles to be incorporated into the positive electrode material subjected to being recycled.

Heat-Treatment Step (S2)

Heat-treating the positive electrode material particles physically separated from the positive electrode in the previous step is performed thereafter. Specifically, in the present step, the positive electrode material particles obtained from the previous step are mixed with a solution or powder containing sodium ions and then the mixture is heat-treated.

In the related art, for example, a method in which positive electrode material particles obtained through mechanical pretreatment are dissolved in sulfuric acid, and then, a solvent extractant is added to extract metal components in the order of manganese, cobalt, and nickel, and lithium components are recovered from a filtrate is used to selectively recover and recycle the lithium components alone among the components of the positive electrode material particles. However, in this case, respective components used in the positive electrode material are separated and recovered, and thus, in order to prepare the positive electrode material using the recovered components, positive electrode material preparation processes are required to be performed from the beginning, and the process of separating each component from the positive electrode material also takes a great deal of cost and time, thereby reducing economic feasibility.

In response, the present disclosure intends to recycle positive electrode material particles to an extent close to an original form thereof by selectively removing only impurities while preventing lithium components from leaching from the recycled positive electrode material particles, and the inventor of the present disclosure has found out that when positive electrode material particles are mixed with a solution or powder containing sodium ions and the heat-treated, fluorine components on a surface of the positive electrode material, which account for a large proportion of impurities may be removed with the least amount of lithium components lost, and the positive electrode material particles may be directly recycled, and thus completed the disclosure.

Specifically, in the process of separating the positive electrode material particles from the positive electrode in the previous step, a portion of a fluorine-based polymer binder remains on the surface of the positive electrode material. Among the fluorine-based polymer binder components remaining on the surface of the positive electrode material, fluorine is not easily combusted unlike carbon, and accordingly, when the positive electrode material is treated at a high temperature, the fluorine component is not removed, but rather reacts with lithium among the positive electrode material components to form lithium fluoride. The lithium fluoride formed on the surface of the positive electrode material may act as impurities in the recycled positive electrode material, and thus needs to be removed through water rinsing, and the like, but lithium fluoride is low soluble in water, which requires a very large amount of water for rinsing and leads to additional loss of lithium components upon the rinsing. Therefore, when the positive electrode material is recycled by simply heat-treating the positive electrode material particles, the lithium components are considerably lost and the recycling process takes a huge cost, and thus is inefficient.

On the other hand, when heat-treatment is performed by mixing positive electrode material particles with a solution or powder containing sodium ions as in the present disclosure, sodium ions react preferentially with fluorine on the surface of the positive electrode material to form sodium fluoride, and thus the amount of lithium components lost in the form of lithium fluoride may be reduced. In addition, the solubility of sodium fluoride in water is 4.06% (with respect to 20° C.), which is much higher than 0.27% of lithium fluoride, and thus, the water rinsing process may be performed with a smaller amount of water. Furthermore, fluorine on the surface of the positive electrode material reacts with hydrogen to prevent the generation of hydrogen fluoride which is a strong acid, thereby maintaining the durability of equipment.

The solution or powder containing sodium ions used in the present step is prepared by using sodium salts capable of generating sodium ions upon dissolution, and the sodium salts may be alkaline, and may be at least one selected from the group consisting of NaOH, $Na_2CO_3$, and $NaHCO_3$. When the solution or powder containing sodium ions is alkaline, hydrogen fluoride that may be generated upon heat-treatment may be neutralized to prevent corrosion of equipment and when the sodium salts described above are used, the removal of fluorine may particularly be highly efficient.

In the present step, the positive electrode material particles are added to a solution or powder containing sodium ions and then heat-treated, and the amount of sodium in the solution or powder containing sodium ions is preferably equal to or greater than the number of moles of fluorine contained in the positive electrode material particles with respect to the number of moles. The number of moles of sodium ions is preferably 150% to 200%, preferably 160% to 190%, more preferably 170% to 180% with respect to the number of moles of F. When the mole ratio of sodium to the number of moles of F is too low, the fluorine components on a surface may not be sufficiently converted to sodium fluoride, and when sodium is at a far high concentration, an excessive amount of sodium is used with respect to the required amount of sodium, which becomes uneconomical.

In addition, when preparing the solution containing sodium ions, it is preferable to prepare a sodium solution at a high concentration of 0.1 to 10 M, preferably 5 to 10 M. This is because, when the sodium concentration of the solution is too low, it may be slurried due to overflow of the solution when mixing with a solid positive electrode material. Conversely, when the sodium concentration of the solution is too high, chances are that sodium salts are precipitated in the solution. The fluorine components on the surface of the positive electrode material may not be sufficiently converted to sodium fluoride, and when sodium is at a far high concentration, an excessive amount of sodium is used with respect to the required amount of sodium, which becomes uneconomical.

In the present step, the heat-treatment may be performed in an oxygen-free atmosphere (or environment), the oxygen-free atmosphere may be an atmosphere having an oxygen concentration of 3 volume % or less, preferably 0 to 2 volume %, and more preferably 0 to 1 volume %. In addition, the oxygen-free atmosphere may be formed by including at least one gas selected from nitrogen, carbon dioxide, and an inert gas. When the heat-treatment is performed in an oxygen-free atmosphere, unnecessary reactions may be prevented.

In the present step, alternatively, the heat-treatment may be performed in an oxygen enrichment atmosphere, the oxygen enrichment atmosphere may be an atmosphere having an oxygen concentration of 20 volume % or greater, preferably 20 to 50 volume %, and more preferably 20 to 21 volume %. When the heat-treatment is performed in the condition of excessive oxygen concentration, there are benefits in that carbon components of the positive electrode material are easily oxidized, and the crystal structure of the positive electrode material is well maintained by preventing the lattice oxygen of the positive electrode material from being consumed.

In the present step, the heat-treatment may be performed at 250 to 800° C., preferably 300 to 650° C., and more preferably 300 to 500° C. When the heat-treatment temperature is within the above range, components such as a conductive material and a binder remaining on the surface of the positive electrode material may be more efficiently removed. Meanwhile, when the heat-treatment temperature is higher than the above range, reduction may locally occur, which may lead to breaking the composition of the positive electrode material, and when the heat-treatment temperature is lower than the above range, carbon components of the positive electrode material may not be removed well.

In addition, the heat-treatment may be performed by raising the temperature constantly (or at a constant rate) before maintaining the temperature for a certain period of time after a specific temperature is reached, then again raising the temperature to a higher temperature at the same rate, and once again maintaining the temperature for a certain period of time. For example, the heat-treatment may be performed by raising the temperature by 5° C. per minute before maintaining the temperature for 0.5 hours at 350° C., and then again raising the temperature up to 450° C. at the same rate before maintaining the raised temperature for 0.5 hours. The maintaining temperature may be within the above range, and the temperature increase rate may be 1 to 10° C. per minute, preferably 3 to 7° C. per minute. The maintaining period of time may be 0.3 to 1 hour, preferably 0.3 to 0.7 hours.

Rinsing Step (S3)

The positive electrode material particles subjected to heat-treatment in the previous step may be rinsed with water and recycled. In the previous step, sodium fluoride is formed on the surface of the positive electrode material particles, and the sodium fluoride on the surface is soluble in water to a certain extent or more, and thus may be simply removed through rinsing with water.

The amount of water used for rinsing in the present step may be significantly less than in the case of heat-treatment without using a solution or powder containing sodium ions, and as described above, in the present disclosure, the fluorine components on the surface of the positive electrode material are converted into sodium fluoride, and thus be readily removed in the step of rinsing.

The positive electrode material particles recycled through the present step may be used as a battery material without separate treatment, and may be utilized while maintaining a composition ratio of a positive electrode active material when first manufactured.

Hereinafter, preferred examples are provided to aid in understanding of the present disclosure. However, the following Examples are for illustrative purposes only to describe the present disclosure and are not intended to limit the scope of the present disclosure.

Example 1

A positive electrode from a used lithium secondary battery was separated, and then crushed and classified to obtain positive electrode material particles ($LiNi_{0.6}Co_{0.2}Mn_{0.2}O_2$) as power. The obtained positive electrode material particles (40 g) were mixed with a 50% NaOH aqueous solution (4 g) and distilled water (14 g), and then heat-treated. The heat-treatment was performed by raising the temperature by 5° C. per minute before maintaining the temperature for 0.5 hours at 350° C., and then again raising the temperature up to 450° C. at the same rate before maintaining the raised temperature for 0.5 hours. The heat-treatment atmosphere was a nitrogen atmosphere, and nitrogen gas was injected by 200 cc per minute. The positive electrode material particles subjected to the heat-treatment were naturally cooled, and then rinsed with water to obtain recycled positive electrode material particles.

Example 2

Recycled positive electrode material particles were obtained in the same manner as in Example 1, except that an aqueous NaOH solution (8 g) was used.

Example 3

Recycled positive electrode material particles were obtained in the same manner as in Example 1, except that a solution in which $Na_2CO_3$ (2.65 g) was mixed with distilled water (15.5 g) was used as a solution containing sodium ions.

Example 4

A positive electrode from a used lithium secondary battery was separated, and then crushed and classified to obtain positive electrode material particles ($LiNi_{0.6}Co_{0.2}Mn_{0.2}O_2$) as power. The obtained positive electrode material particles (40 g) were mixed with a 50% NaOH aqueous solution (4 g) and distilled water (14 g), and then heat-treated. The heat-treatment was performed by raising the temperature by 5° C. per minute before maintaining the temperature for 0.5 hours at 350° C., and then again raising the temperature up to 450° C. at the same rate before maintaining the raised temperature for 0.5 hours. The heat-treatment atmosphere was an oxygen enrichment atmosphere, and oxygen gas was injected by 3 L/min. The positive electrode material particles subjected to the heat-treatment were naturally cooled, and then rinsed with water to obtain recycled positive electrode material particles.

Comparative Example

Recycled positive electrode material particles were obtained in the same manner as in Example 1, except that the positive electrode material particles were heat-treated without being mixed with a solution containing sodium ions.

Experimental Example 1. Identification of Fluorine Leaching Rate and Leaching Components in Examples and Comparative Example The positive electrode material particles before heat-treatment in Example 1 were subjected to ion chromatography (IC) analysis to identify the amount of fluorine in positive electrode material particles before heat-treatment, and the amount of fluorine in the positive electrode material particles before heat-treatment was 1.51%, which was 604 mg with respect to 40 g of positive electrode material particles. With respect to the above values, the amount of fluorine leached from the positive electrode material particles and the fluorine leaching rates after heat-treatment in Examples and Comparative Example in the process of rinsing with water were identified. Specifically, after heat-treatment, distilled water (150 g) was added to a total amount of the obtained positive electrode material particles, and then the mixture was subjected to hand shaking for 10 minutes, filtered using a 0.2 μm syringe filter, and the amount of fluorine in the filtrate was identified through ion chromatography. The results are shown in Table 1 below, and in Table 1, the fluorine leaching rate is expressed as a percentage of the amount of fluorine leached in 150 g of distilled water out of 604 mg of fluorine contained in 40 g of positive electrode material particles.

TABLE 1

| | Amount of fluoride leached into distilled water (mg/kg) | Fluorine leaching rate (%) |
|---|---|---|
| Comparative Example | 760 | 18.9 |

TABLE 1-continued

| | Amount of fluoride leached into distilled water (mg/kg) | Fluorine leaching rate (%) |
|---|---|---|
| Example 1 | 1910 | 47.5 |
| Example 2 | 3500 | 85.8 |
| Example 3 | 1300 | 32.3 |
| Example 4 | 3480 | 85.3 |

Based on the above results, it was confirmed that, when the method for recycling a positive electrode material as provided herein is used, a large amount of fluorine present on the surface of the positive electrode material is converted to sodium fluoride upon heat-treatment, and thus may be easily leached with distilled water, and accordingly, it was confirmed that the amount of water used in water rinsing may be saved.

In particular, in Comparative Example, the leaching rate was only 18.9%, indicating that a large amount of fluorine remained on the surface of the positive electrode material particles, whereas in Examples 1 to 4 of the present disclosure, the leaching rate was 30% or greater, indicating that a large amount of fluoride was removed with respect to Comparative Example, and in Example 2 where sodium hydroxide was used as sodium salts and the sodium salts had a high sodium concentration, the leaching rate was 80% or greater, indicating that most of the fluorine was easily leached and removed upon rinsing.

In addition, it was confirmed from the comparison of Examples 1 to 4 that, when sodium hydroxide having a stronger alkalinity was used as sodium salts, the fluorine leaching rate was high, and thus the strong alkaline sodium salts had a higher fluorine leaching efficiency than the weak alkaline sodium salts. However, strong alkaline sodium salt compounds are highly reactive compared to weak alkaline sodium salt compounds to require a particular caution when it comes to handling and storage, and thus, apparently, the appropriate type of sodium salts may be selected according to the level of fluorine leaching rate required.

Figure 5:
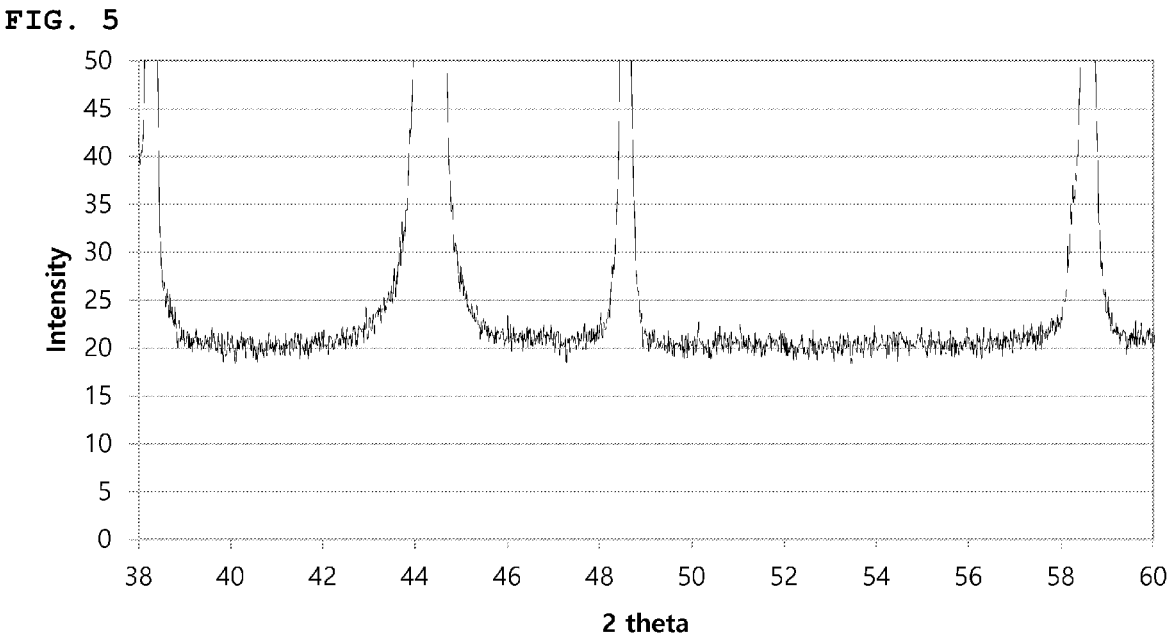
FIG. 5 is a graph of XRD analysis of powder obtained after heat-treatment in Comparative Example.

Additionally, XRD analysis of powder after heat-treatment in Examples and Comparative Example identified the crystalline phase of a fluorine compound in the powder. XRD analysis graphs for Examples 1 to 4 are shown in FIGS. 1 to 4, and an XRD analysis graph for Comparative Example is shown in FIG. 5.

Figure 3:
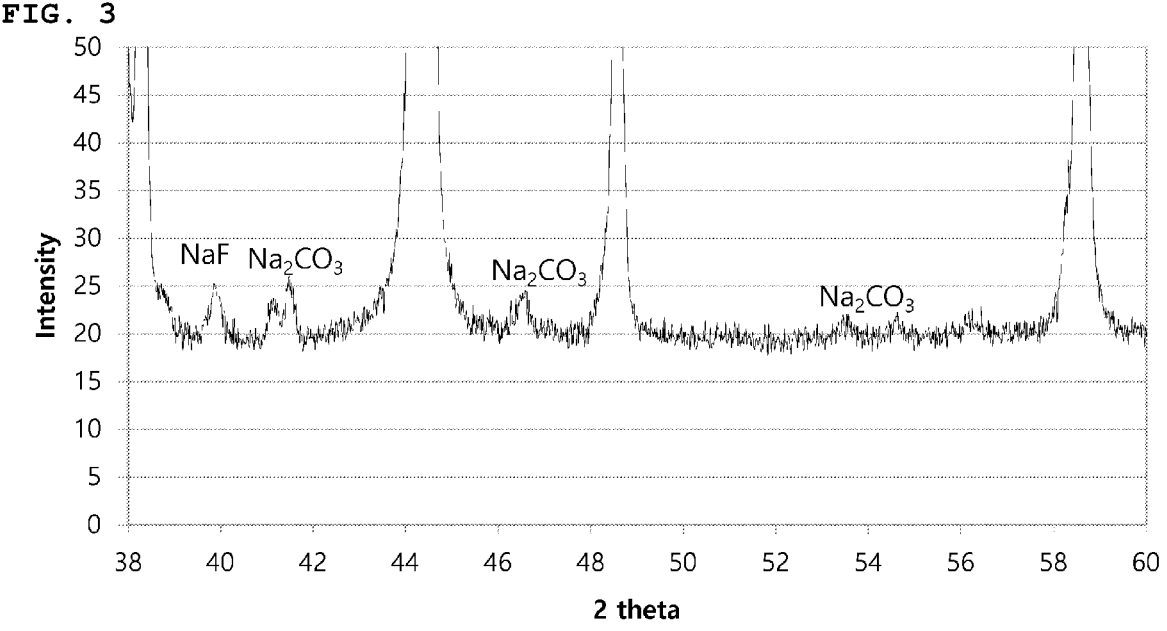
Figure 4:
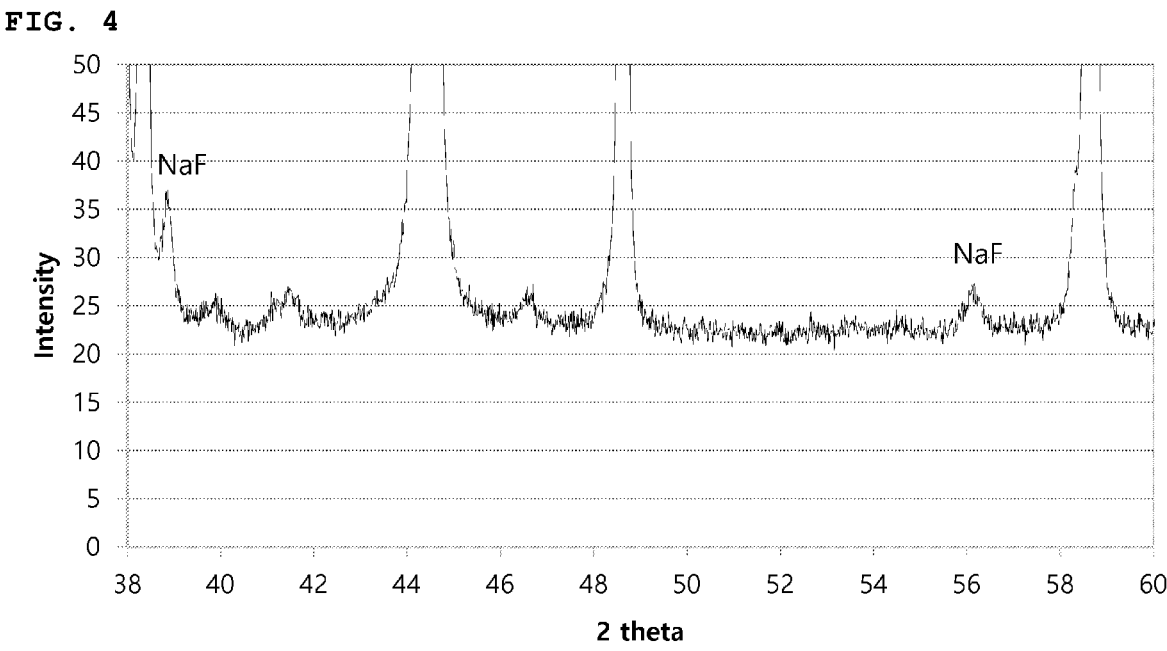

As seen in FIGS. 1 to 4, in Examples, sodium fluoride (NaF) components are present, and it is confirmed that the fluorine components of positive electrode material particles are converted to sodium fluoride and then removed upon rinsing. Meanwhile, in Example 3 using sodium carbonate as sodium salts, as seen in FIG. 3, along with the sodium fluoride, the sodium carbonate was present in the leachate, indicating that a portion of the fluorine components failed to react with the sodium carbonate. This is consistent with the results that the fluorine leaching rate in Example 3 was lower than the fluorine leaching rates in Examples 1, 2, and 4 above, and that indicates that when relatively weak alkaline sodium salts are used, the fluorine compound formation rate of the positive electrode material particles is lower than when strong alkaline sodium salts are used. Meanwhile, as seen in FIG. 5, sodium fluoride was not observed in Comparative Example because sodium salts were not used.

Experimental Example 2. Identification of
Composition and Characteristics of Positive
Electrode Material Particles Before and After
Heat-Treatment Compositions and characteristics of the positive electrode material particles of Examples 1 to 4 and Comparative Example before and after general heat-treatment were identified. The heat-treatment was performed by taking 5 g of positive electrode material particles in an ambient atmosphere of 550° C. for 3 hours.

First, the amount of lithium in the positive electrode material particles before and after heat-treatment was analyzed through ICP-OES. The results are shown in Table 2 below. An increase in the amount of lithium in the process of heat-treatment is believed to be due to the fact that a fluorine-based polymer binder component present on a surface of the positive electrode material particles, and carbon black used as a conductive material were burned and removed, resulting in an increase in the relative amount of lithium.

In addition, the amount of metal components leached when the positive electrode material particles were rinsed with water before and after heat-treatment was identified. Specifically, 5 g of the positive electrode material particles of each of Examples 1 to 4 and Comparative Example was taken, and respectively mixed and stirred with 100 g of distilled water, and then the supernatant was taken and filtered using a syringe filter having a filter pore size of 0.45 μm. ICP-OES analysis of the filtrate identified the type and amount of metal components leached into distilled water when the positive electrode material particles were rinsed before and after heat-treatment. Table 3 below shows the concentration of the metal components leached before heat-treatment or the results of converting the concentration into the leaching rate, and Table 4 below shows the concentration of the metal components leached after heat-treatment or the results of converting the concentration into the leaching rate.

Lastly, the form in which the lithium components leached with distilled water are present was identified. Specifically, among the preceding steps, the filtered leachate obtained from the positive electrode material particles after heat-treatment was dried at reduced pressure at 68° C. and 300 mbar, dried to 95% or more, and then recycled as powder. The crystal structure of the recycled powder was analyzed through XRD. Based on the analysis, a $Li_2CO_3$ peak and a partial LiF peak were identified, and the results of weight ratio analysis through Rietveld Refinement are shown in Table 5 below. This indicates that some of the fluorine components may be removed through water rinsing, but the amount of lithium lost together is significant compared to the amount of fluorine removed. In particular, it is seen that when the positive electrode material is recycled without being mixed with a solution containing sodium ion sources and being subjected to heat-treatment, the ratio of LiF having low solubility in the filtrate was high, whereas in Examples 1 to 4, the ratio of LiF was relatively low. As shown in FIGS. 1 to 4, in the positive electrode materials of Examples 1 to 4 after heat-treatment, F is present in a significant portion as NaF. That is, the low proportion of LiF may result in low fraction of LiF in the filtrate, and NaF having high solubility is rinsed with water instead of LiF having low solubility, and thus, the amount of distilled water required for rinsing may be possibly reduced. Side effects of wastewater generation due to the use of excessive amount of distilled water and secondary leaching of lithium may be preventable. In terms of direct recycle, it is seen that a desired positive electrode active material may be obtained only when lithium salts are added as much as the amount of leached lithium.

TABLE 2

|  | Lithium amount before heat-treatment (wt %) | Lithium amount after heat-treatment (wt %) |
| --- | --- | --- |
| Comparative Example | 6.81 | 7.33 |
| Example 1 | 6.81 | 7.33 |
| Example 2 | 6.81 | 7.32 |
| Example 3 | 6.81 | 7.32 |
| Example 4 | 6.81 | 7.33 |

TABLE 3

|  | Before heat-treatment | | | |
| --- | --- | --- | --- | --- |
|  | Ni concentration in leachate (ppm) | Co concentration in leachate (ppm) | Mn concentration in leachate (ppm) | Li conversion leaching rate in leachate |
| Comparative Example | <1 ppm | <1 ppm | <1 ppm | 4.5% |
| Example 1 | <1 ppm | <1 ppm | <1 ppm | 4.5% |
| Example 2 | <1 ppm | <1 ppm | <1 ppm | 4.5% |
| Example 3 | <1 ppm | <1 ppm | <1 ppm | 4.5% |
| Example 4 | <1 ppm | <1 ppm | <1 ppm | 4.5% |

TABLE 4

|  | After heat-treatment | | | |
| --- | --- | --- | --- | --- |
|  | Ni concentration in leachate (ppm) | Co concentration in leachate (ppm) | Mn concentration in leachate (ppm) | Li conversion leaching rate in leachate |
| Comparative Example | <1 ppm | <1 ppm | <1 ppm | 24.9% |
| Example 1 | <1 ppm | <1 ppm | <1 ppm | 14.7% |
| Example 2 | <1 ppm | <1 ppm | <1 ppm | 11.4% |
| Example 3 | <1 ppm | <1 ppm | <1 ppm | 14.9% |
| Example 4 | <1 ppm | <1 ppm | <1 ppm | 11.3% |

TABLE 5

|  | $Li_2CO_3$ weight ratio after heat-treatment (wt %) | LiF weight ratio after heat-treatment (wt %) |
| --- | --- | --- |
| Comparative Example | 91 | 9 |
| Example 1 | 98 | 2 |
| Example 2 | 99 | <1 |
| Example 3 | 98 | 2 |
| Example 4 | 99 | <1 |

The invention claimed is:
1. A method for recycling a positive electrode material, the method comprising:
  (S1) obtaining positive electrode material particles from a positive electrode;
  (S2) heat-treating the positive electrode material particles that includes mixing the positive electrode material particles with a solution or powder containing sodium ions such that the sodium ions react with fluorine at the positive electrode material particles to form sodium fluoride; and (S3) rinsing the heat-treated positive electrode material particles with water.

2. The method of claim 1, wherein the step (S1) comprises:

(S1-1) crushing the positive electrode of a lithium secondary battery into crushed parts; and (S1-2) classifying the crushed parts to separate the positive electrode material particles from current collector particles.

3. The method of claim 1, wherein the step (S1) is performed using a chemical solvent immersion method or a heat-treatment method.

4. The method of claim 1, wherein the solution or the powder containing sodium ions is alkaline.

5. The method of claim 1, wherein the solution or the powder containing sodium ions is prepared using at least one selected from the group consisting of NaOH, $Na_2CO_3$, and $NaHCO_3$.

6. The method of claim 1, wherein the solution or the powder containing sodium ions has a number of moles of sodium ions that is 150% to 200% greater than a number of moles of the fluorine.

7. The method of claim 1, wherein the solution containing sodium ions has a sodium concentration of 0.1 to 10 M.

8. The method of claim 1, wherein the heat-treatment is performed in an oxygen-free atmosphere.

9. The method of claim 8, wherein the oxygen-free atmosphere is an atmosphere having an oxygen concentration of 3 volume % or less.

10. The method of claim 8, wherein the oxygen-free atmosphere is formed by including at least one gas selected from a group comprising of nitrogen, carbon dioxide, and an inert gas.

11. The method of claim 1, wherein the heat-treatment is performed in an oxygen enrichment atmosphere.

12. The method of claim 11, wherein the oxygen enrichment atmosphere is an atmosphere having an oxygen concentration of 20 volume % or greater.

13. The method of claim 1, wherein the heat-treatment is performed at 250 to 800° C.

14. The method of claim 3, wherein the chemical solvent comprises methylpyrrolidone (NMP) or dimethylacetamide (DMAC).

* * * * *